(12) United States Patent
Aronovich et al.

(10) Patent No.: US 8,812,794 B2
(45) Date of Patent: Aug. 19, 2014

(54) RESOLVING MESSAGING DEADLOCK IN A DISTRIBUTED SHARED MEMORY

(75) Inventors: Lior Aronovich, Ramat Gan (IL); Ron Asher, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 4 days.

(21) Appl. No.: 13/539,546

(22) Filed: Jul. 2, 2012

(65) Prior Publication Data
US 2012/0271886 A1 Oct. 25, 2012

Related U.S. Application Data

(63) Continuation of application No. 12/197,766, filed on Aug. 25, 2008, now Pat. No. 8,543,773.

(51) Int. Cl.
*G06F 12/00* (2006.01)

(52) U.S. Cl.
USPC .............. 711/147; 711/E12.001; 709/204

(58) Field of Classification Search
CPC ............... G06F 12/0246; G06F 12/0888
USPC ................ 711/146, 147, E12.001
See application file for complete search history.

(56) References Cited

U.S. PATENT DOCUMENTS

| 5,649,184 A * | 7/1997 | Hayashi et al. ............ 711/147 |
| 6,078,981 A | 6/2000 | Hill et al. |
| 6,973,548 B1 | 12/2005 | Vartti et al. |
| 2002/0095554 A1 | 7/2002 | McCrory et al. |
| 2002/0161889 A1 | 10/2002 | Gamache et al. |
| 2003/0115268 A1 | 6/2003 | Esposito |
| 2006/0174069 A1 | 8/2006 | Shaw et al. |
| 2006/0224838 A1 * | 10/2006 | Blumrich et al. ............ 711/146 |

OTHER PUBLICATIONS

J.B. Carter, J.K. Bennett, W. Zwaenepoel, "Techniques for reducing consistency-related communication in distributed share-memory systems", ACM Transactions on Computer Systems (TOCS), v.13 n.13, p. 205-243, Aug. 3, 1995.
P. Keleher, A.L Cox, W. Zwaenepoel, "Lazy release consistency for software distributed shared memory", ACM SIGARCH Computer Architecture News, v.20 n.2, p. 13-21, Mar. 9, 1992.
K. Li, P. Hudak, "Memory coherence in shared virtual memory systems", ACM Transactions on Computer Systems (TOCS) v.7 n.4, p. 321-359, Nov. 1989.

(Continued)

*Primary Examiner* — Larry Mackall
(74) *Attorney, Agent, or Firm* — Griffiths & Seaton PLLC

(57) ABSTRACT

Systems and methods for implementing a distributed shared memory (DSM) in a computer cluster in which an unreliable underlying message passing technology is used, such that the DSM efficiently maintains coherency and reliability. DSM agents residing on different nodes of the cluster process access permission requests of local and remote users on specified data segments via handling procedures, which provide for recovering of lost ownership of a data segment while ensuring exclusive ownership of a data segment among the DSM agents detecting and resolving a no-owner messaging deadlock, pruning of obsolete messages, and recovery of the latest contents of a data segment whose ownership has been lost.

27 Claims, 13 Drawing Sheets

(56) References Cited

OTHER PUBLICATIONS

B. Nitzberg, V. Lo, "Distributed Shared Memory: A Survey of Issues and Algorithms", Computer, v.24 n.8, p. 52-60, Aug. 1991.

V. Prabhakaran, A.C. Arpaci-Dusseau, R.H. Arpaci-Dusseau, "Analysis and Evolution of Journaling File Systems", Proceedings of the USENIX Annual Technical Conference, p. 1-16, Apr. 10-15, 2005.

K.W. Preslan, A.P. Barry, J.E. Brassow, G.M. Erickson, E. Nygaard, C.J. Sabol, S.R. Soltis, D.C. Teigland, and M.T. O'Keefe, "A 64-bit, shared disk file system for Linux," in Proceedings of the 16th IEEE Mass Storage Systems Symp., p. 22-41, Mar. 1999.

J. Protic, M. Tomasevic, V. Milutinovic, "Distributed Shared Memory: Concepts and Systems", IEEE Parallel & Distributed Technology: Systems & Applications, v.4, n.2, p. 63-79, Summer 1996.

M. Stumm, S. Zhou, "Algorithms Implementing Distributed Shared Memory", Computer, v.23, n.5, p. 54-64, May 1990.

A.S. Taenbaum, Distributed Operating Systems, Prentice Hall, Inc., Chap. 5, Distributed File Systems, p. 245-288, Chap. 6, Distributed Shared Memory, p. 289-375, 1995.

\* cited by examiner

| Entry # | 1 | ••• | N |
|---|---|---|---|
| Owner | | | |
| Permission | | | |
| Copies | | | |
| Usage | | | |
| Pending exclusives | | | |
| Message out | | | |
| Message ID local | | | |
| Message ID remote | | | |
| Data segment version | | | |
| No owner deadlock resolving indication | | | |
| Synchronization mechanisms | | | |

| Permission Request | Permission Response | Invalidation Request | Invalidation Response |
|---|---|---|---|
| data segment id | data segment id | data segment id | data segment id |
| requested permission | granted permission | message id remote | data segment version |
| message id local | data segment | data segment version | |
| message id remote | contents attainment | | |
| data segment version | ownership transfer | | |
| | local permission | | |
| | data segment version | | |

RESOLVING MESSAGING DEADLOCK IN A DISTRIBUTED SHARED MEMORY

CROSS-REFERENCE TO RELATED APPLICATION

This application is a continuation application of U.S. application Ser. No. 12/197,766, filed Aug. 25, 2008, now U.S. Published Application US 2010/0049922A1, the entire contents of which are incorporated herein by reference and is relied upon for claiming the benefit of priority.

FIELD OF THE INVENTION

The present invention relates to apparatus and methods for implementing a shared memory in a distributed system, such as a cluster of connected computers.

BACKGROUND

Distributed shared memory (DSM) provides an abstraction that allows users to view a physically distributed memory of a distributed system as a virtual shared address space. DSM provides a convenience for programmers of distributed applications, reducing or eliminating the requirement to be aware of the distributed architecture of the system and the requirement to use a less intuitive form of communication on a distributed system via message passing. DSM also provides a means to directly port software written for non-distributed systems to work on distributed systems.

There are many forms of DSM algorithms and technologies, all of them sharing a fundamental architecture of being composed of distributed agents deployed on a plurality of clustered nodes, maintaining local data structures and memory segments, and using a communication protocol over a message passing layer to coordinate operations. Message traffic should be minimized for a given load of work, and memory coherency must be maintained.

One vulnerability of existing DSM algorithms and technologies is the assumptions they make regarding the reliability of the underlying layer of message passing. These assumptions include:
  Reliable message passing. Namely messages always reach their destination and are not delayed.
  Deterministic final feedback provided by the message passing layer on the fate of each message, i.e. whether the message reached its destination or not.
  Ordering of messages. Namely messages that are sent earlier arrive earlier at their destination.
DSM technologies that rely on any subset of these assumptions, where the message passing layer does not fully support these assumptions, are vulnerable to loss of memory coherency and to possible corruption of both user data and internal data structures. Unfortunately, in real-life systems those assumptions do not fully apply for message passing layers, and there is a non-zero probability of their violation, possibly resulting in data corruption. This significantly limits the applicability of existing DSM technologies.

SUMMARY OF THE INVENTION

In accordance with one embodiment of the invention, a method is provided which includes:
  providing a distributed shared memory (DSM) that provides a service to users to obtain access permission on a requested data segment from a plurality of data segments;
  the DSM residing in a cluster and including two DSM agents, each agent residing on a different one of the clustered nodes, and each agent maintaining a local set of memory data segments each having an associated access permission and ownership by one of the DSM agents; and
  the DSM agents determining the access permission and ownership of a data segment in response to a user request for access to the data segment.

In accordance with another embodiment of the invention, a method is provided which includes:
  providing a distributed shared memory (DSM) that provides a service to users to obtain access permission on a requested data segment from a plurality of data segments;
  the DSM residing in a cluster and including two DSM agents, each agent residing on a different one of the clustered nodes, and each agent maintaining a local set of memory data segments each having an associated access permission and ownership by one of the DSM agents; and
  the DSM agent that is the owner maintaining a latest contents of the owned data segment.

In accordance with another embodiment of the invention, a method is provided which includes:
  providing a distributed shared memory (DSM) that provides a service to users to obtain access permission on a requested data segment from a plurality of data segments;
  the DSM residing in a cluster including two DSM agents, each agent residing on a different one of the clustered nodes, and each agent maintaining a local set of memory data segments and associated local parameters which include an access permission and ownership by one of the DSM agents;
  a method of recovering ownership of a data segment comprising:
    when a user initiates a request for access to a data segment and the user's local DSM agent determines that: (i) the local agent itself is not the owner of the requested data segment; (ii) an upgrade in a permission for access to the requested data segment is required; and (iii) the local agent has no ongoing messaging session with the remote agent for the requested data segment;
    the local agent initiates a messaging session by sending a message to the remote agent that the local agent is not the owner of the requested data segment; and
    when the remote agent receives the request and determines from its local parameters that it is not the owner of the requested data segment, the remote agent sending a response to the local agent granting ownership of the requested data segment to the local agent.

In one embodiment, the agents block all other user requests on that data segment until either the messaging session ends or the user requesting access times out.

In one embodiment each agent maintains as parameters:
  a local-message-10 to which the local agent assigns a local unique ID upon issuing a request; and
  a remote message ID to which the local agent assigns the ID received in a request from the remote agent.

In one embodiment
  each agent includes the local-message-ID and remote-message-ID in requests and responses; and
  if, prior to the remote agent receiving the request and sending a response, the remote agent sends a request message for the same data segment to the local agent within a designated time of the local user's request;

the agents detect that a no-ownership deadlock exists when:

each of the local and remote agents process their received requests which contain a value for the local-message-ID which is different than the local value for the local-message-ID; and the no-ownership deadlock is resolved when:

the one local agent, which has been predetermined to act as the one agent to resolve the no-ownership-deadlock, determines that no other local user is acting to resolve a no-ownership-deadlock, and the predetermined one local agent then resolves the no-ownership-deadlock by unblocking the request from the remote agent and sending a message to the remote agent granting ownership of the requested data segment to the remote agent.

In one embodiment:

the value assigned to the local-message-ID induces an order of values; and when an agent receives a message having a value for the remote-message-ID which is of an order less than the local value of the remote-message-ID maintained by the receiving agent for the respective data segment, the receiving agent determines that the message is obsolete and does not process the message.

In accordance with another embodiment of the invention, a method is provided which includes:

providing a distributed shared memory (DSM) that provides a service to users to obtain access permission on a requested data segment from a plurality of data segments;

the DSM residing in a cluster including two DSM agents, each agent residing at a different one of the clustered nodes, and each agent maintaining a local set of memory data segments and associated an parameters which include an access permission and ownership by one of the DSM agents;

the DSM agent that is the owner maintaining a latest contents of the owned data segment;

each agent maintaining a local data segment version parameter, wherein when an agent modifies the data segment content it assigns a value to the data segment version parameter, and each agent including its local value of the data segment version in requests and responses sent by the respective agent;

wherein, once at least one agent has determined that ownership of a data segment has become lost, a method of restoring the latest data segment contents comprising:

a first of the two DSM agents receiving a permission request from the second of the DSM agents for a data segment which the first agent maintains as owned by the second agent; and the first agent determining that its data segment contents is latest if either: (i) the first agent has a valid access permission on the data segment;

(ii) the first agent does not have a valid permission on the data segment and the first agent's local value of the data segment version is more recent that the value of the data segment version in the permission request received from the second agent;

upon determining that its local data segment content is the latest, the first agent sending its data segment content to the second agent with a response granting ownership of the data segment to the second agent.

In other embodiments of the invention, systems and computer program products are provided which implement the previously described method embodiments.

BRIEF DESCRIPTION OF THE DRAWINGS

Several embodiments of the present invention are described hereinafter with reference to the drawings, in which:

FIG. 2 is an embodiment of a data structure for DSM table entries;

FIG. 3 is one embodiment of type and data structures for DSM messages;

DETAILED DESCRIPTION

A-1. Distributed Shared Memory (DSM)

Figure 1:
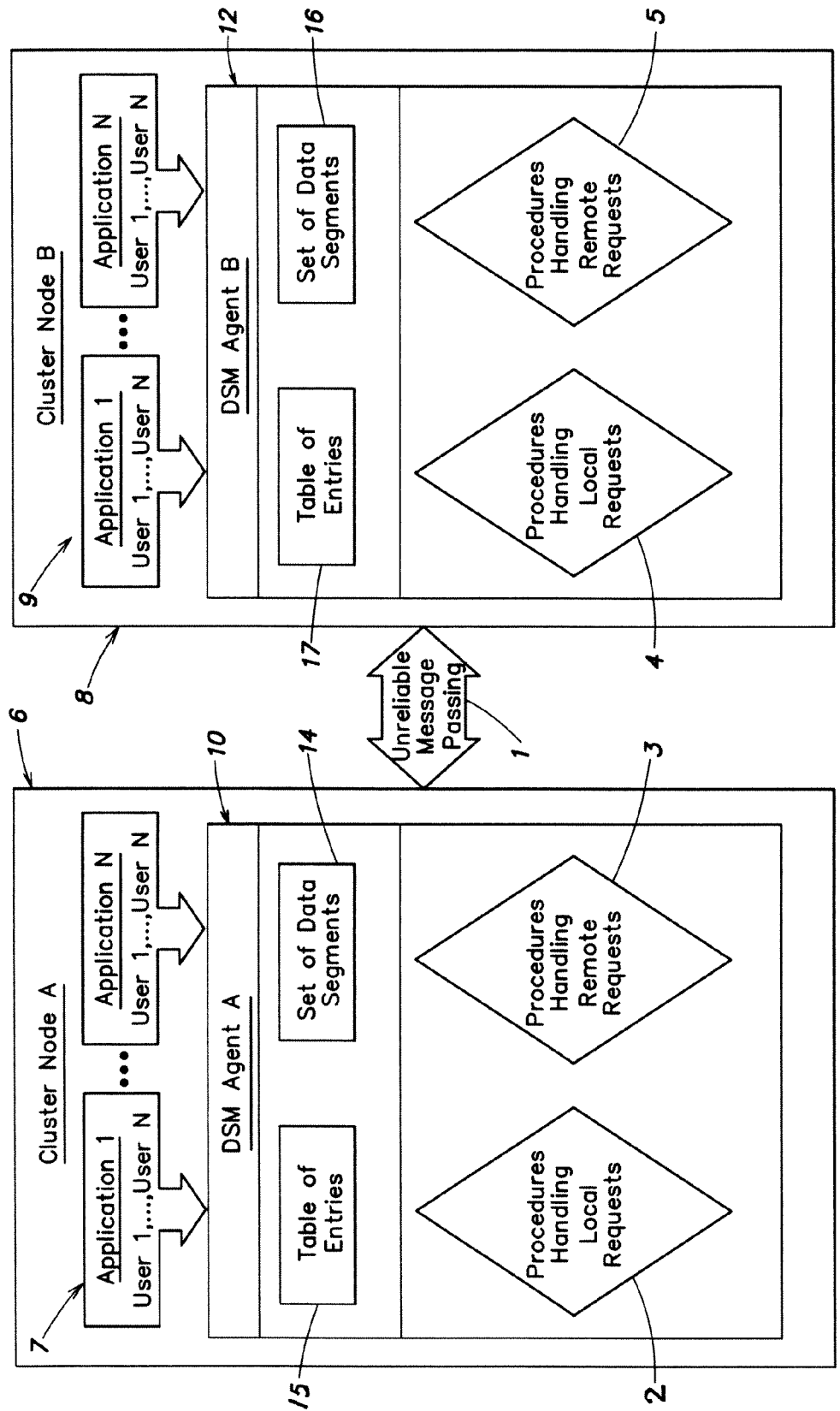
FIG. 1 shows schematically a system for implementing a distributed shared memory in accordance with one embodiment of the invention in which DSM Agents A and B reside on different clustered nodes A and B and communicate via an unreliable message passing layer.
Figure 4:
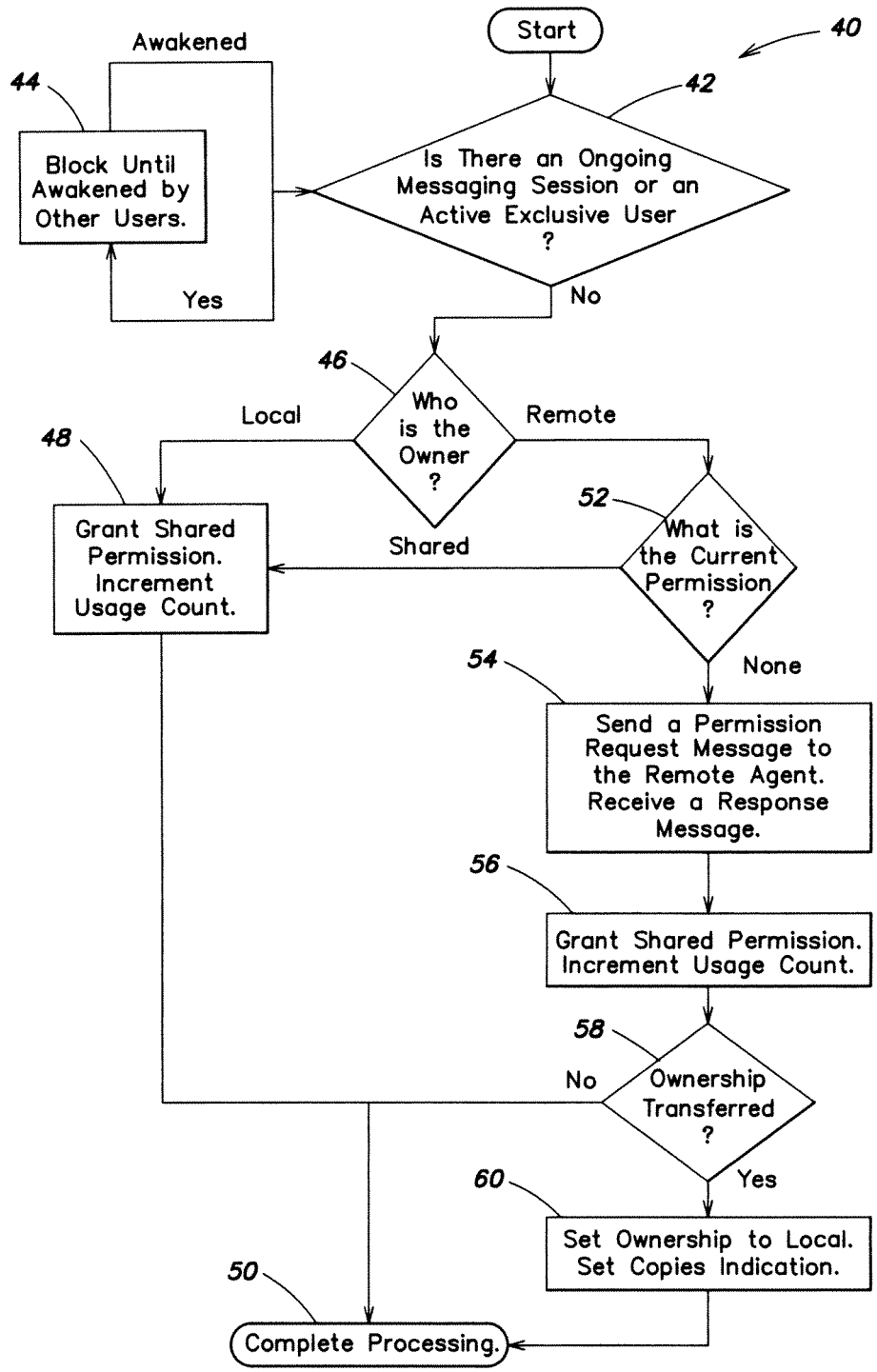
FIG. 4 is a flow diagram of a procedure for granting shared permission to a local user, according to one embodiment of the invention.
Figure 5A:
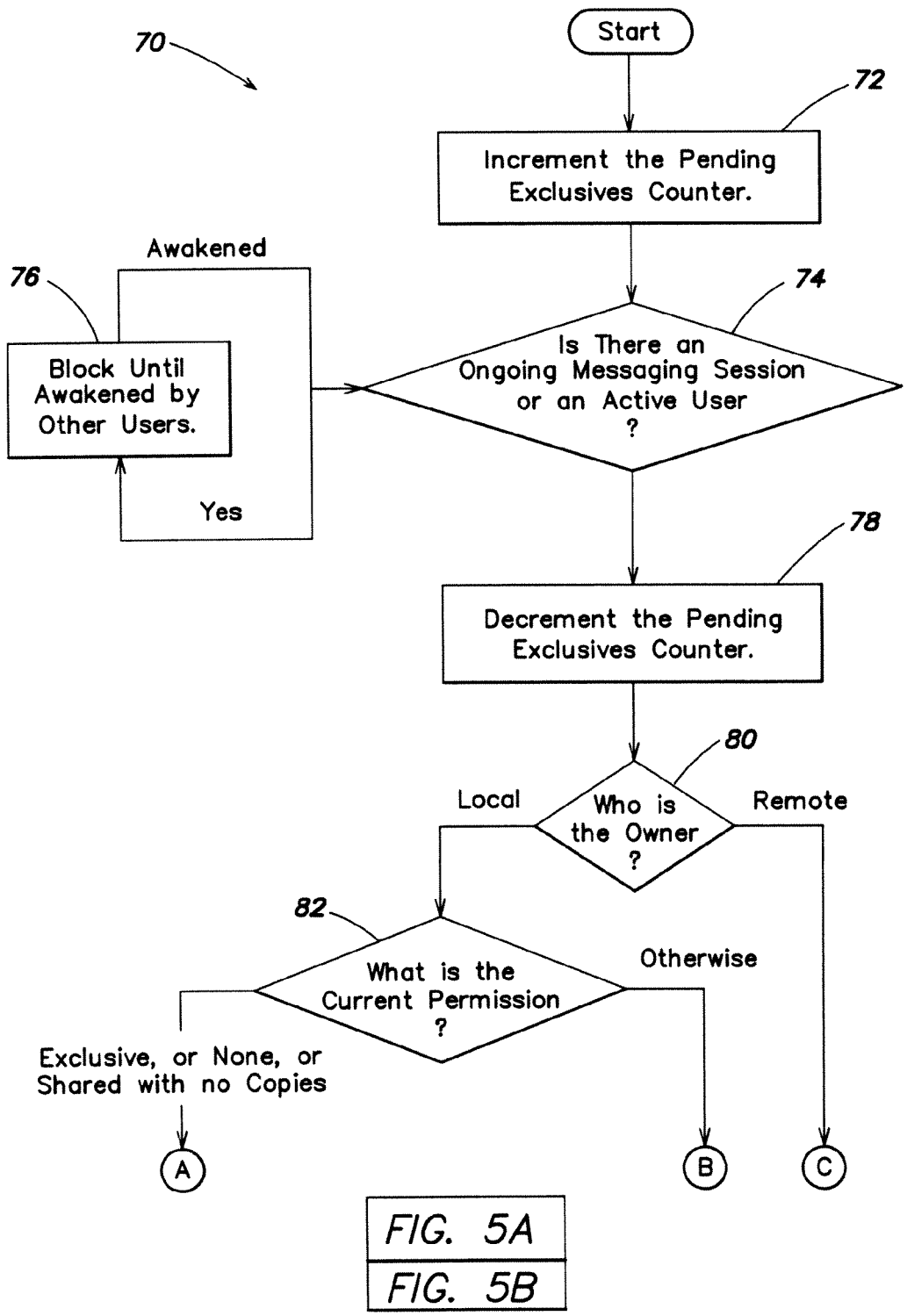
FIG. 5 is a flow diagram of a procedure for granting exclusive permission to a local user, in accordance with one embodiment of the invention.
Figure 5B:
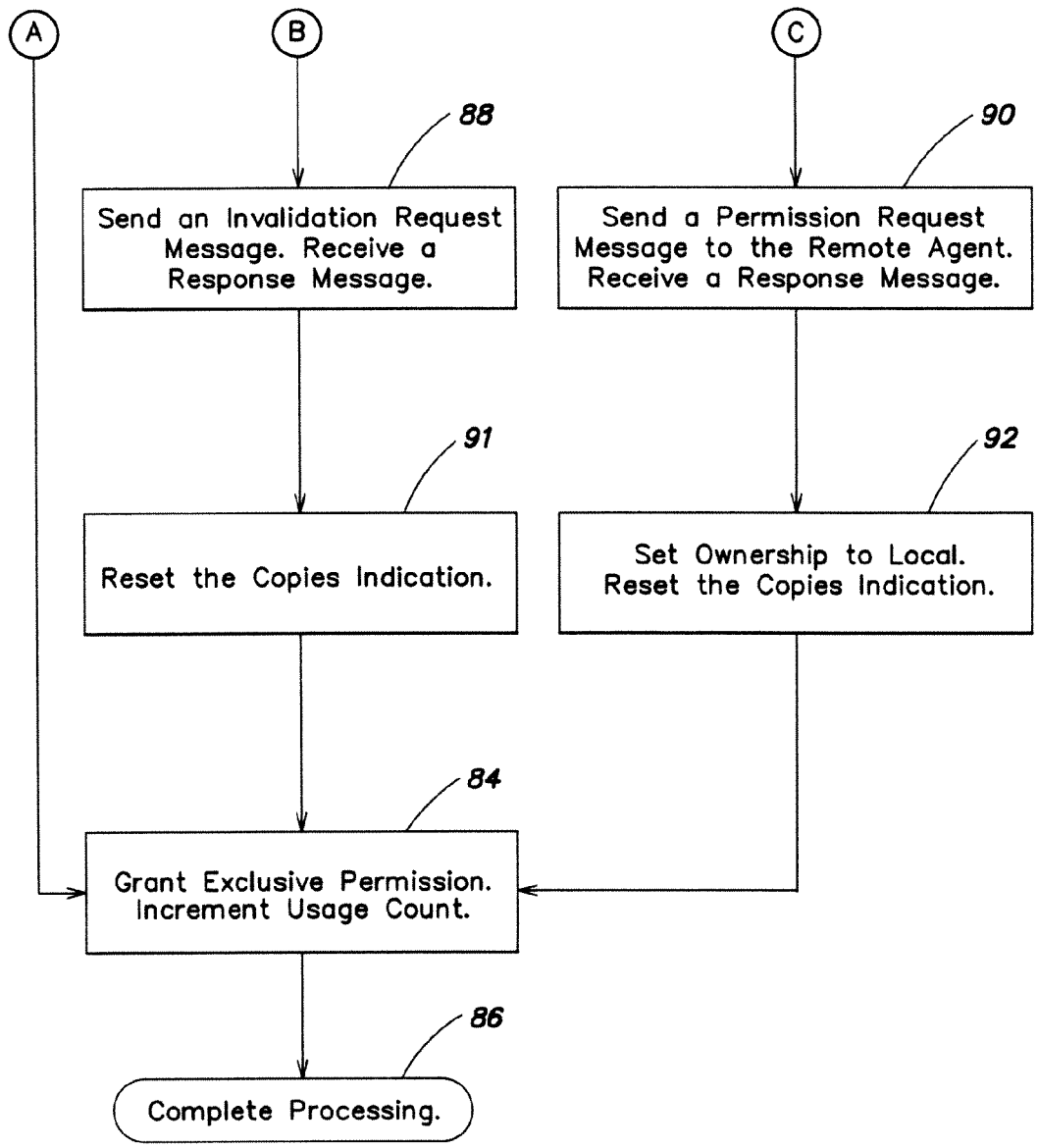
Figure 6:
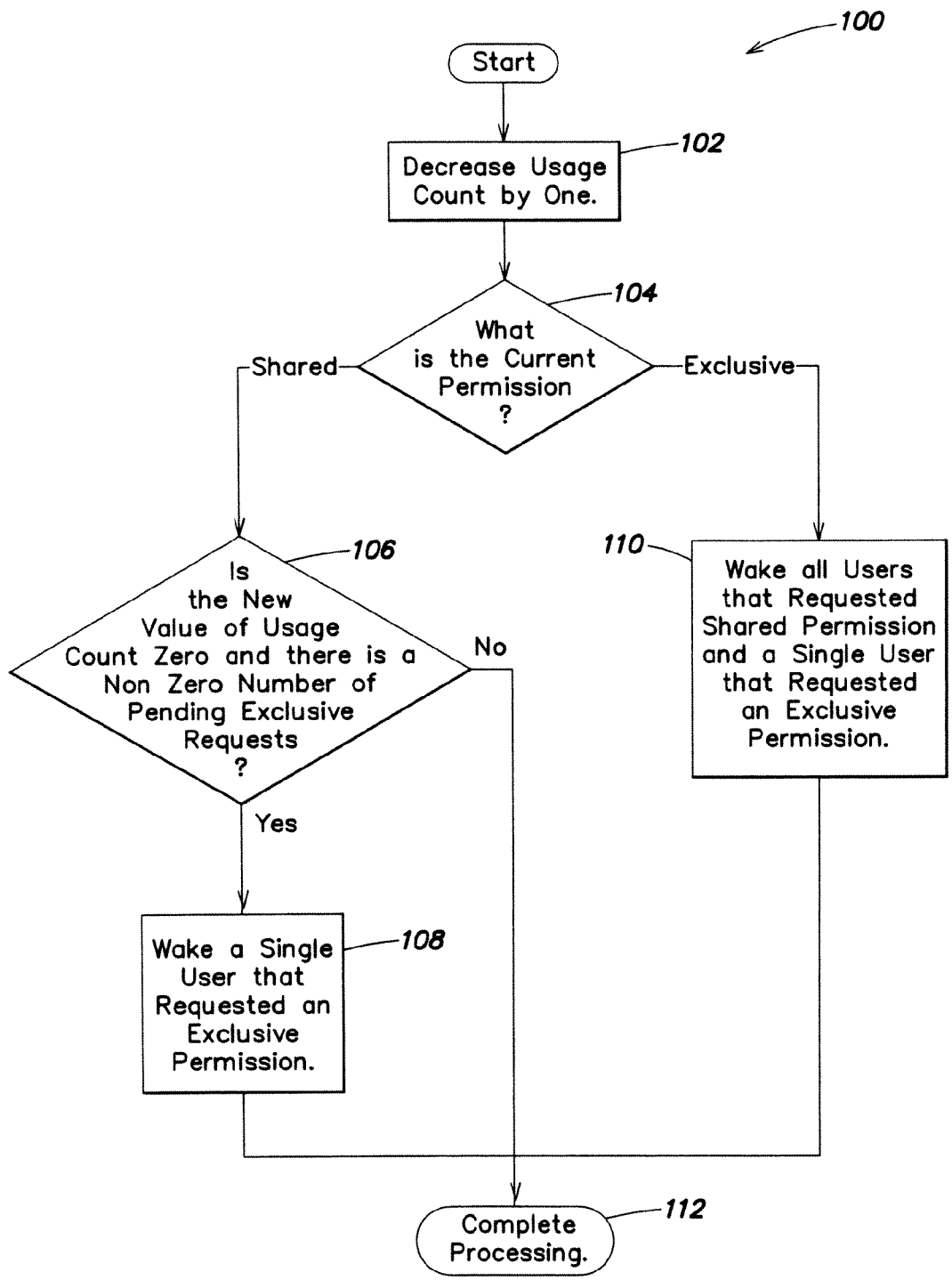
FIG. 6 is a flow diagram of a procedure for notification of completion on usage of a local user, in accordance with one embodiment of the invention.
Figure 7:
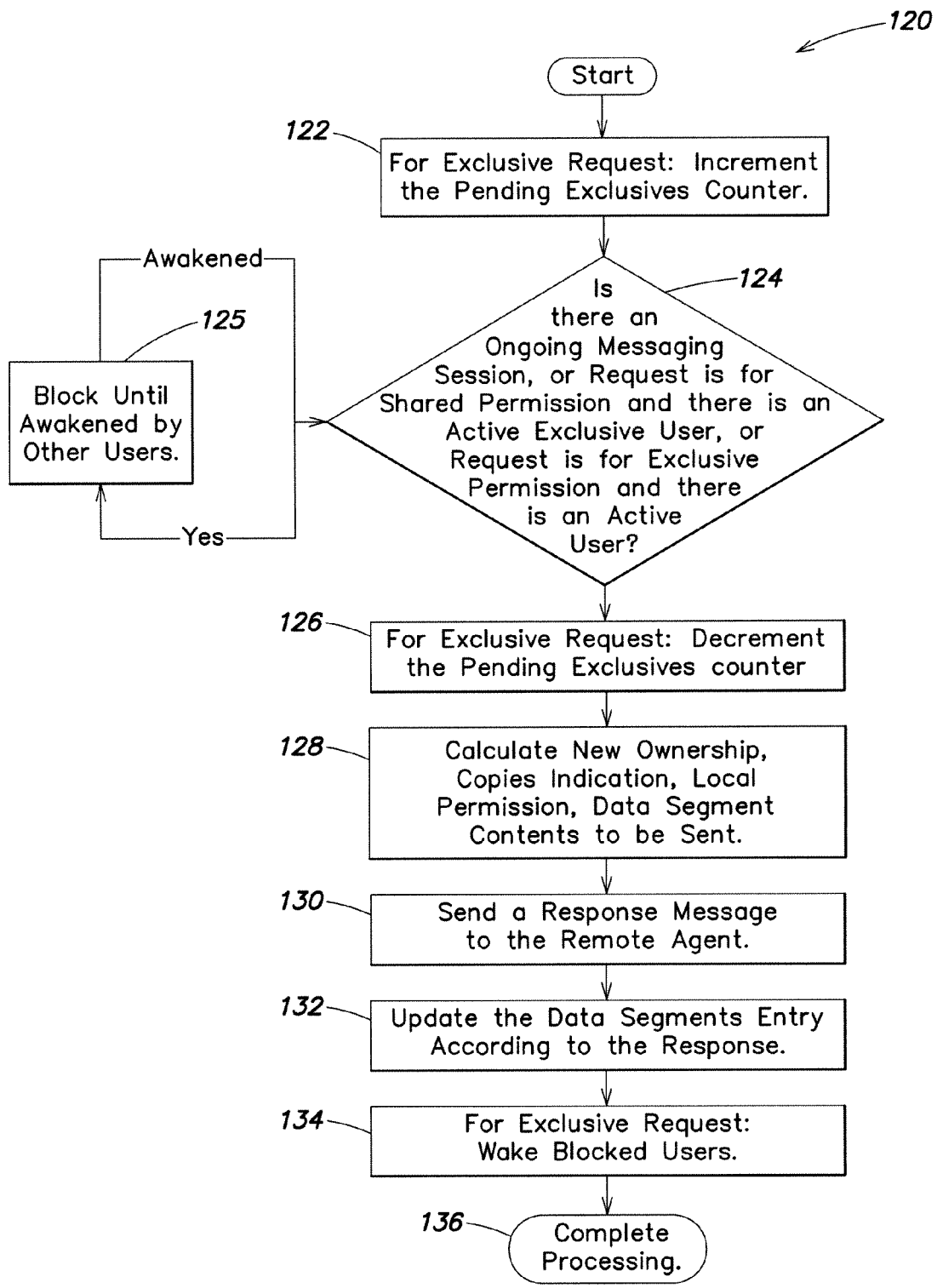
FIG. 7 is a flow diagram of a procedure for processing a permission request from a remote user, in accordance with one embodiment of the invention.

Various embodiments of a DSM algorithm and technology will now be described which assume an unreliable underlying message passing layer. Therefore, uncertainty exists regarding whether a message sent has reached its designation (possibly with delays) or not, and there is no feedback provided on the fate of each message. It is further assumed that there is no order on the reception of messages relative to the order of their generation or sending. Given these assumptions, the DSM algorithm is able to efficiently maintain memory coherency.

In understanding the described embodiments, the following definitions may be useful:

Computer cluster. A group of connected computers, assumed in various embodiments to be working together and thus forming in several respects a single computational unit; such clusters typically provide improved performance and/or availability.

Distributed shared memory. A technology providing an abstraction that allows users to view a physically distributed memory of a distributed system as a virtual shared address space. Abbreviation: DSM.

Memory coherency. The integrity of data stored in the distributed memories comprising a virtual shared memory. Generally, all users accessing the virtual shared memory, performing both read and write operations, must be provided with a consistent and serialized view of the data stored in the virtual shared memory.

User of a distributed shared memory. A procedure that uses DSM, and is executed by a specific thread of operation within a computer application.

Data segment. A memory unit of arbitrary fixed or variable size. The entire memory space of a DSM is partitioned into data segments.

Permission to access a data segment. A user may obtain permission to access a specified data segment, atomically with respect to all other users on all nodes sharing the DSM. The permission may be shared, namely the data segment may be only read. This permission can be obtained concurrently by multiple users with respect to a data segment. Alternatively the permission may be exclusive, namely the data segment may be also modified. This permission is mutual exclusive with all other users with respect to a data segment. A valid permission is either a shared or an exclusive permission.

Mutual exclusion. Conditions according to which users are either permitted to access data segments or alternatively blocked, due to access permissions concurrently held by other users. Specifically, a request for shared access permission on a data segment must block as long as there is a user holding an active exclusive access permission on that data segment, or there is a pending user waiting for exclusive access permission on that data segment (under certain conditions). A request for exclusive access permission on a data segment must block as long as there is another user with an active permission on that data segment.

Upgrade of permission. An operation of switching from no permission to shared or exclusive permission on a data segment, or switching from shared permission to exclusive permission on a data segment.

Ownership of a data segment. Each data segment is owned at any given time by no more than one of the DSM agents. The identity of the owner of each data segment (i.e. local or remote) is recorded by each agent in the data segment's entry. Ownership of a data segment may be transferred to another node, as a result of processing user requests. The owner of a data segment serializes processing of requests issued in parallel for that data segment, and has complete knowledge on the whereabouts of the latest contents of that data segment. When a user requires an upgrade of permission on a specific data segment, a request must be issued to the owner of that data segment if the owner is remote.

Message passing. A form of communication, commonly used in distributed and clustered computing, based on sending of messages to recipients.

Messaging session. A communication between the DSM agents, with regard to a data segment, comprising a request message from agent A to agent B and a subsequent response message from agent B to agent A. A messaging session is terminated upon reception of a response from the other agent or when the operation within which the request was sent times out. A single messaging session is allowed per data segment at a time.

A-2. DSM Agents, Table Entries, Data Fields, and Permissions

In accordance with one embodiment, the DSM technology (FIG. 1) consists of two agents 10 (DSM Agent A) and 12 (DSM Agent B), each residing on a different one of the clustered nodes A and B (6, 8 respectively), each node having a set of local applications (users) 1 to N (7, 9 respectively), and each agent using a local set of memory data segments 14, 16 and an associated table of entries 15, 17, wherein each data segment is associated with an entry. The DSM agents A and B each have procedures 2, 4 for handling their respective local requests 7, 9, i.e., issued by local users (applications) 1 through N, and procedures 3, 4 for handling remote requests (from the other agent) via an unreliable message passing layer 1.

The entire memory space of the DSM is partitioned into data segments of arbitrary fixed or variable sizes. A user may obtain permission to access a specified data segment, atomically with respect to all other users on all nodes sharing the DSM. The permission may be shared, namely the data segment may be only read. This permission can be obtained concurrently by multiple users with regard to a data segment. Alternatively the permission may be exclusive, namely the data segment may be also modified. This permission is mutual exclusive with all other users with regard to a data segment. A valid permission means either shared or exclusive permission. The latest permission for each data segment is recorded by each agent 10, 12 within its respective table of entries 15, 17. Permissions are modified only due to user requests.

Each data segment has an owner, which is set to be one of the two DSM agents 10, 12. The owner's identify for each data segment (i.e. local or remote) is recorded by each agent in the data segment's entry (in tables 15, 17). When a user requires an upgrade of permission on a specific data segment, a request must be issued to the owner of that data segment if the owner is remote. The owner of a data segment serializes processing of requests issued in parallel for that data segment, and has complete knowledge on the whereabouts of the latest contents of that data segment. Ownership of a data segment may be exchanged between the agents, triggered by processing of user requests, in the following cases: a) when a user is given exclusive permission on a data segment, the agent of its node is set to be the owner of that data segment; b) when a user is given shared permission on a data segment and the remote owner does not have any permission on that data segment, the agent of the node of the requesting user is set to be the owner of that data segment.

To facilitate the DSM algorithm, each DSM agent maintains a local table of entries. An example of a data structure 25 for the DSM table of entries is illustrated in FIG. 2. Each entry is associated with a data segment, and consists of the following data fields:

Owner—indicates whether the current owner of the data segment is local or remote;

Permission—indicates the local permission on the data segment (may be none, shared or exclusive);

Copies—set to true if the local agent is the owner of the data segment and the remote agent has a copy of the data segment, otherwise set to false;

Usage—indicates the number of users currently using the data segment on the local node. This counter is incremented when a user receives a permission on the data segment, and decremented when a user having a valid permission notifies on termination of usage.

Pending Exclusives—indicates the number of pending exclusive requests on the data segment on the local node.

This counter is desirable in order to avoid starvation of users requesting exclusive permission, in a case where there is an endless stream of sequential users requesting shared permission. When a user requesting an exclusive permission has to block due to mutual exclusion, this counter is incremented thus informing other users on this pending request, and decrements this counter after clearing mutual exclusion. Users requesting shared permission block in certain conditions if this counter is non-zero.

Additional fields, described herewith, are used to facilitate detection and resolving of messaging deadlock situations, and to recover the latest contents of data segments, as elaborated in the next sections:

Message Out—indicates the type of request message concerning the data segment that was sent to the remote agent and not responded yet. If there is no ongoing messaging session, this field is set to a null value.

Message Id Local, Message Id Remote—indicate the latest ids of messages, concerning the data segment, generated by the local agent and received from the remote agent correspondingly.

Data Segment Version—indicates the version number of the data segment contents stored at the local agent.

No Owner Deadlock Resolving Indication—used to prevent redundant deadlock resolving threads for a data segment which is in a state of no owner.

To facilitate efficient scalability in terms of the number of data segments managed by the DSM agents, the table of entries should be compact, meaning that the values of each field are encoded so that each field is allocated with a minimal number of bits.

Each entry is also augmented with four synchronization mechanisms. One mechanism facilitates mutual exclusion for accessing the entry's fields. The other three mechanisms enable synchronized blocking and awakening for users that identify mutual exclusion conditions that necessitate their blocking; more specifically, one is for users seeking shared permission, a second is for users seeking exclusive permission, and a third is for users that identify an ongoing messaging session.

When a user requires a permission, which entails upgrading the current permission held by its local agent on the requested data segment (upgrading means switching from no permission to shared or exclusive permission on a data segment, or switching from shared permission to exclusive permission on a data segment), a message may be sent to the remote agent to coordinate processing of the request. There are four types of messages between DSM agents:

Permission request: Sent from a non-owner agent to the agent holding ownership of a data segment, in order to upgrade permission on that data segment.

Permission response: Sent from an agent holding ownership of a data segment to the remote agent, granting to the remote agent the requested permission.

Invalidation request: Sent from an agent holding ownership of a data segment to the remote agent, in a case where the owning agent requires to upgrade its permission from shared to exclusive, and the remote agent may hold valid copies of that data segment.

Invalidation response: Sent from a non-owner agent to the agent holding ownership of a data segment, acknowledging invalidation of the requested data segment.

FIG. 3 illustrates one embodiment of data structures 26 for each of these requests and associated responses for DSM messaging.

When processing a request for permission from a local or remote user (via a message), the handling procedure must first check for any conditions that entail it to block, and it may not proceed until the blocking conditions are cleared. One condition for blocking is mutual exclusion. Namely, a request for shared access permission on a data segment must block as long as there is a user holding active exclusive access permission on that data segment, or there is a pending user waiting for exclusive access permission on that data segment (this applies under certain conditions). A request for exclusive access permission on a data segment must block as long as there is another user with an active permission on that data segment. In addition to mutual exclusion conditions, a handling procedure must block as long as there is an ongoing messaging session (indicated by the Message Out field). A messaging session is terminated upon reception of a response from the remote agent or when the operation within which the request was sent times out. This enables to maintain a single messaging session per data segment at a time.

Further details of the DSM handling procedures are explained below.

A-3. DSM Handling Procedures

Several handling procedures are defined within the DSM algorithm. These procedures are described below with reference to FIGS. 4-7.

A procedure 40 for handling a request of a local user for shared permission (FIG. 4) checks 42 first the blocking conditions, as specified earlier, and blocks 44 until these conditions are cleared. If ownership is determined 46 to be local, a shared permission is granted by the local agent and the usage count is incremented by one 48 and the procedure terminates 50. If ownership is determined 46 to be remote and the local agent is determined 52 to hold shared permission on the data segment, the usage count is incremented by one 48 and the procedure terminates 50. If ownership is determined 52 to be remote and the local agent does not hold a valid permission, a message is sent 54 to the remote agent requesting shared permission on that data segment. When a response is received, with the latest data segment contents, shared permission is granted and the usage count is incremented by one 56. According to the response, ownership of the data segment may be also transferred 58. In this case the local agent records its ownership and the copies indication is set 60 to true if the remote agent keeps shared permission or false otherwise, and the procedure terminates 50.

A procedure 70 for handling a request of a local user for exclusive permission (FIG. 5) checks 74 first the blocking conditions, as specified earlier, blocking 76 until these conditions are cleared. The pending exclusive counter is incremented 72 before checking these conditions and decremented 78 after clearing them. If ownership is determined 80 to be local and it is determined that 82 the local agent has an exclusive or no permission or shared permission without copies of the data segment, then an exclusive permission is granted 84 by the local agent and the usage count is incremented by one 84, and the procedure terminates 86. If ownership is determined 80 to be local and the local agent has a shared permission with copies, then a message is sent 88 to the remote agent requesting to invalidate its copies. Upon reception of a response 88 the copies indication is set 90 to false, an exclusive permission is granted by the local agent and the usage count is incremented by one 84 and the procedure terminates 86. If ownership is determined 80 to be remote, a message is sent 90 to the remote agent requesting an exclusive permission on the data segment. Upon reception of a response 90, with the latest data segment contents, an exclusive permission is granted (resetting the copies field), ownership is set to the local agent and the usage count is incremented by one 92, and the procedure terminates 86.

A procedure 100 for handling a local user notification of termination of usage of a data segment (FIG. 6) decreases by one the usage count of that data segment 102. If the permission on that data segment is determined 104 to be shared and it is determined 106 that the new value of the usage count is zero and there is a non-zero number of pending exclusive requests, then a single blocked user that issued an exclusive request on that data segment is awakened 108, and the procedure terminates 112. If the permission on that data segment is determined 104 to be exclusive then all blocked users that issued a shared request and a single blocked user that issued an exclusive request (if it exists) on that data segment are awakened 110, and the procedure terminates 112.

A procedure 120 for handling a message sent by a remote user requesting permission on a data segment (FIG. 7) checks 124 first the blocking conditions, as specified earlier, blocking 125 until these conditions are cleared. If the request is for exclusive permission, the pending exclusive counter is incremented 122 before checking these conditions and decremented 126 after clearing them. A response is then sent 130 to the requesting agent and the data segment's entry is updated 132, based on the following calculations 128. Ownership is transferred if the request is for exclusive permission, or the request is for shared permission and the local agent does not have a valid permission on the data segment. The copies field is reset if the ownership is transferred. The local permission is invalidated if the request is for exclusive permission or there is no current valid permission. Otherwise the local permission is set to shared. The data segment contents is sent if there is current valid permission on that data segment. In addition, in case the request is for exclusive permission blocked users are awakened 134, and the procedure terminates 136, so that one of the unblocked users shall send a request to the remote owner.

The procedure for handling a message sent by a remote user requesting invalidation of a shared permission on a data segment checks first the blocking conditions 124, as specified earlier, blocking 125 until these conditions are cleared. The pending exclusive counter is incremented 122 before checking these conditions and decremented 126 after clearing them. However, since there may be a deadlock between an invalidate request (from owning agent to non-owning agent) and a permission request (from non-owning agent to owning agent), the procedure handling the invalidation request is defined to resolve such a deadlock, by avoiding blocking due to an ongoing messaging session in case such a deadlock is identified (the method for identification is specified in the following sections). After clearing the blocking conditions the local permission is invalidated, blocked users are awakened, so that one of them shall sent a request to the remote owner, and a response acknowledging the invalidation is the sent to the requesting agent.

A-4. Support of Unreliable Message Passing

Because real-life message passing technologies are unreliable, assuming full reliability of an underlying message passing technology would expose a DSM technology to a non-zero probability of data corruption. The DSM algorithm and technology of the present embodiment supports unreliable message passing technologies. It assumes complete uncertainty on whether a message that is sent reaches its destination (possibly with delays) or not, and assumes there is no feedback on the fate of each message. It further assumes no ordering on the reception of messages relative to the order of their generation or sending. Given these assumptions, the present DSM algorithm efficiently maintains consistency both of user and internal data, and does not require additional messages nor run-time for this support.

Given an underlying unreliable message passing technology, the following problems arise and should be resolved:

a) Ownership of a data segment may be lost when a message, sent in response to a permission request, carries a transfer of ownership and the message is lost or delayed. Note that the agent sending such a response waives its ownership regardless of the fate of the response. Since most operations require a valid owner for a data segment, the owner should be recovered;

b) It must be ensured that a data segment never has two owners, since such a situation may cause data corruption; and c) Since the owner of a data segment has complete knowledge of the whereabouts of the latest contents of the data segment, if ownership is lost this knowledge is also lost, and should be recovered.

A-5. Recovering Ownership of a Data Segment

Consider the first and second problems. When ownership of a data segment is lost, the present DSM algorithm employs the following protocol for recovering the ownership, ensuring that there are no two owners of a data segment. In the initial state both agents are not owners of the considered data segment, and thus assume that the other agent is the owner. The basic idea is that ownership can not be taken by an agent; it can only be given by the other agent. When an agent receives a request addressed to the owner of a data segment (i.e. a permission request), and that agent is not recorded as the owner in its local entry of the data segment, it deterministically concludes that there is currently no owner of that data segment cluster-wide, and it gives ownership of that data segment to the other agent within the response it sends. If this response reaches the other agent, in a time frame by which the user that triggered sending the request is still waiting for the response, the agent that receives the response becomes the new owner of the data segment. In case a response is received when the user that triggered sending the request is no longer waiting for the response (i.e. the user timed out), this response is discarded, regardless of its contents.

Figure 8:
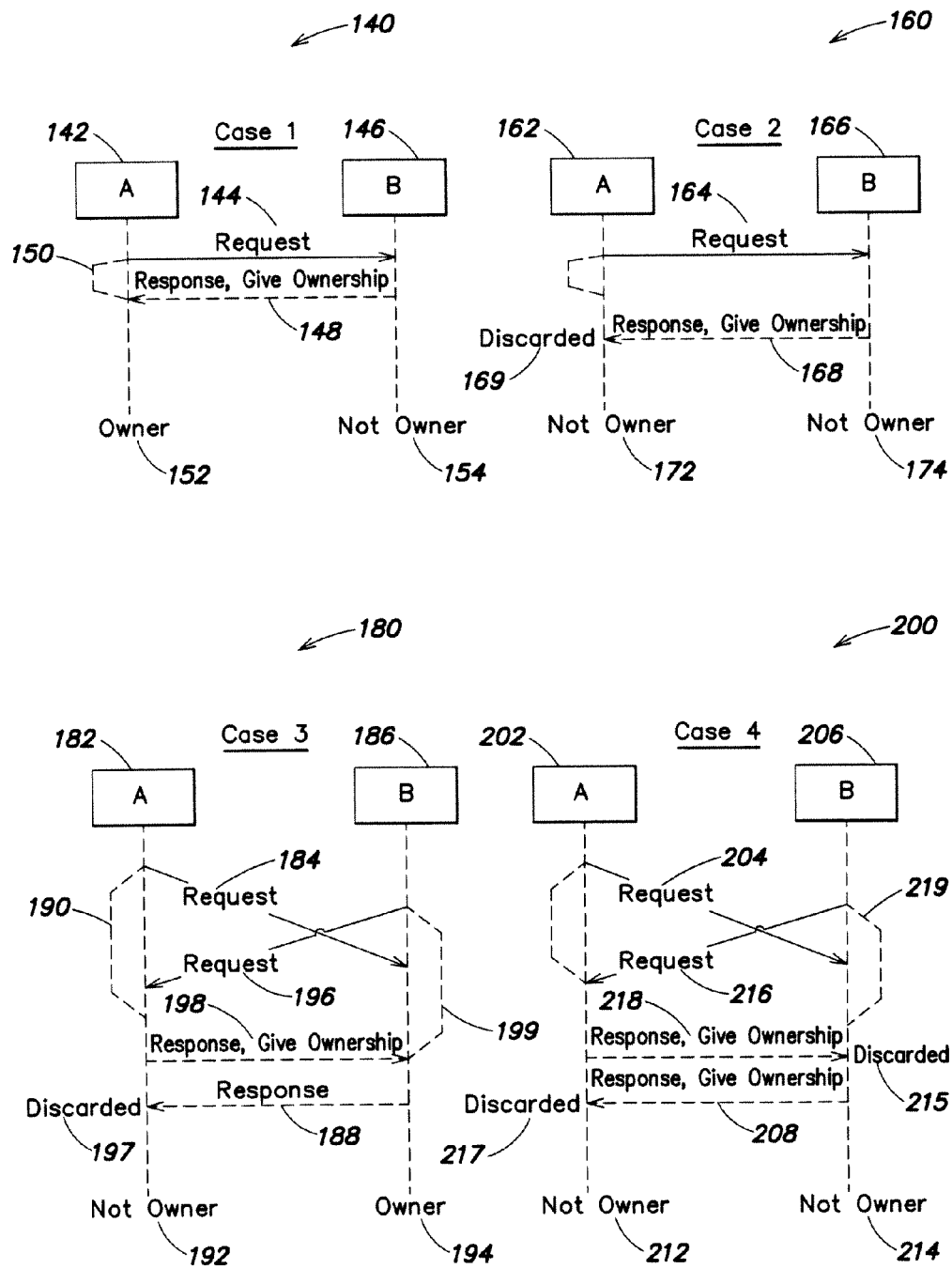
FIG. 8 is a schematic illustration of four case scenarios relating to a protocol for recovering ownership of a data segment among the DSM agents, in accordance with various embodiments of the invention.

This protocol ensures that a data segment never has two owners, since it is impossible that the two agents receive ownership of a data segment from each other at the same time, as further elaborated. Recall that an agent may send only one request per data segment at a time. Consider the following four (4) cases illustrated in FIG. 8:

Case 1 (140): Agent A 142 sends a request 144 that reaches agent B 146 before B sends any request on that data segment. In this case agent B sends a response 148 (giving ownership to agent A), that reaches agent A while the relevant user is still waiting 150 for the response (a requesting local user of A has not timed out). Agent A becomes the new owner 152, and agent B remains not an owner 154.

Case 2 (160): This case is similar to case 1, except that the response 168 sent by agent 8 166 reaches agent A 162 after the wait period 170 of the relevant user has timed out, thus the response 168 is discarded 169. Therefore, both agents are not the owners 172, 174 of the data segment.

Case 3 (180): Agent A 182 sends a request 184 that reaches agent 8 186 after 8 sends a request 196 on the same data segment. Both requests 184, 196 become blocked on the remote side as their handling procedures identify an ongoing messaging session. One of the two users that triggered sending the requests times out and the agent of the timed out user eventually processes the request of its counterpart agent and sends a response. Assume without loss of generality that the user timing out 190 is affiliated with agent A, the response 198 reaches the user affiliated with agent 8 before timing out 199, in which case only agent 8 becomes the owner 194, since agent A shall discard 197 the response 188 to the original request 184 of agent A.

Case 4 (200): This case is similar to case 3, except that the response 218 from agent A 202 reaches the user affiliated with agent 8 206 after timing out 219, in which case both responses 218, 208 sent by both agents are discarded 215, 217 by their remote agents. Therefore both agents are not the owners 212, 214 of the data segment.

A-6. Resolving a No Owner Messaging Deadlock

In the scenario of case 4, both agents 202, 206 send concurrent permission requests 204, 216 on a same data segment not owned by both, and both responses 208, 218 are discarded 217, 215, thus failing both requests and failing to recover ownership of that data segment 212, 214. This scenario is referred to as a no owner messaging deadlock. Data segments that are accessed with high contention from both agents, for which ownership is lost, may exhibit sequentially repeating occurrences of this scenario, thus detrimentally affecting performance. To improve performance the DSM algorithm of the present embodiment employs a procedure 220 illustrated in FIG. 9 which deterministically detects whether such a deadlock occurs, and upon detection resolves the deadlock. Noting that detection of such a deadlock must be deterministic; otherwise both nodes may receive ownership of a data segment, causing data corruption.

Figure 9:
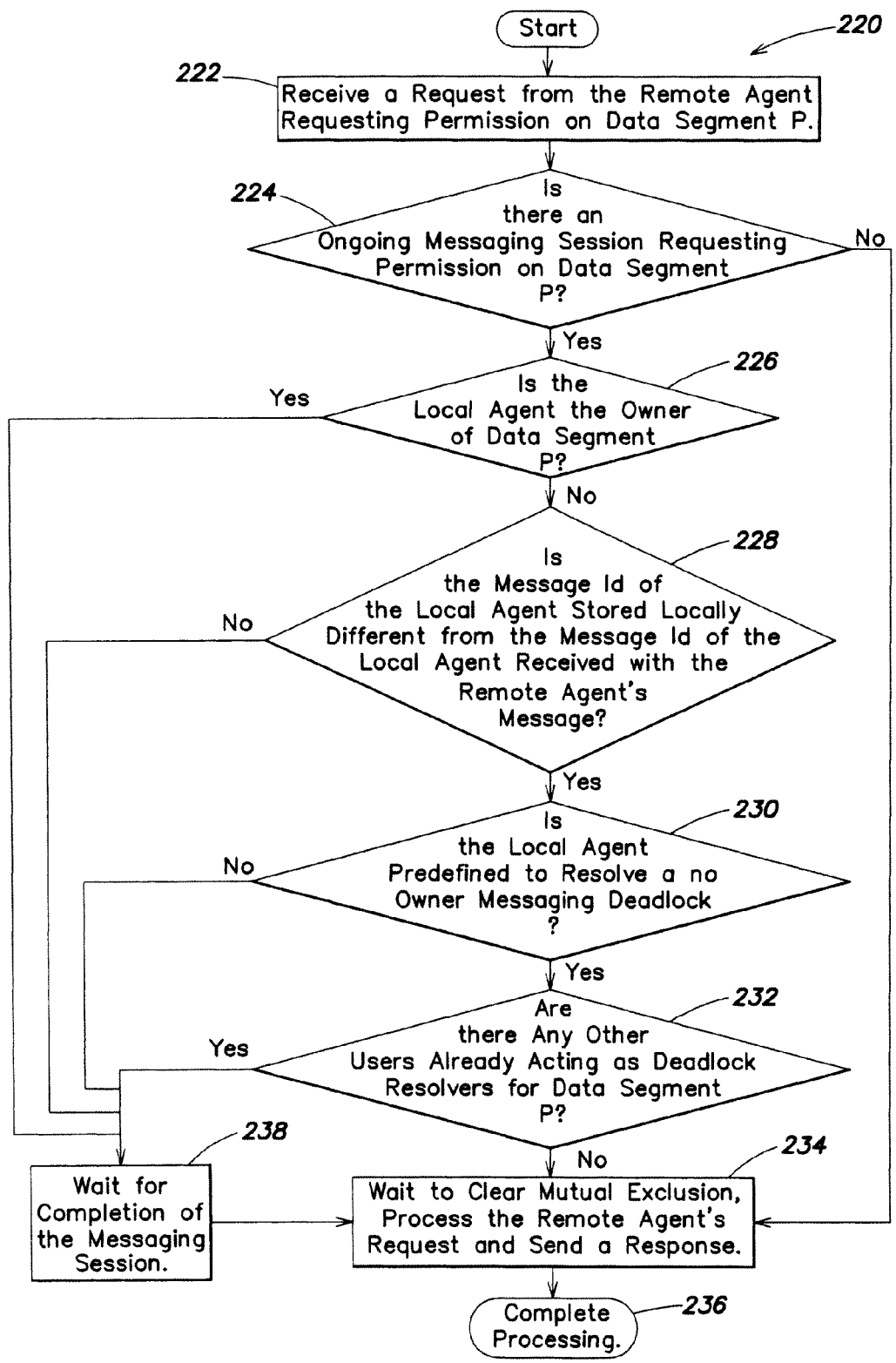
FIG. 9 is a flow diagram of a procedure for detecting and resolving a no owner messaging deadlock, according to one embodiment.

As shown in FIG. 9, such a deadlock is detected by an agent A when, upon receiving 222 and processing 224-236 a message of agent 8 requesting permission on a data segmentP, the following conditions are determined to be true:
a) Agent A is not the owner of data segment P (determining step 226 based on the entry's owner field);
b) There is currently an ongoing messaging session requesting permission on data segment P (determining step 224 based on the entry's message out field);
c) Agent 8 did not see agent A's permission request message before sending its permission request message (determining step 228 based on the entry's message ld field);

While the calculations of conditions a and b are more straightforward, the calculation and associated logic required for condition c requires some elaboration, which is given in the next section.

Upon detection of such a deadlock, only one predetermined agent (determining step 230), and only a single user operating via the one predetermined agent on data segment P (determining step 232 based on the entry's no owner deadlock resolving indication field) may enter the deadlock resolving protocol. The handling procedure of this single user within the predetermined agent avoids waiting for completion of the messaging session, and sends 234 a response, thus resolving the deadlock, and the procedure thereafter terminates 236. Meanwhile, the other users operating via both agents have waited 238 for completion of the messaging session.

A-7. Detection and Resolving of Messaging Deadlocks

Messages arrive at their destination with an arbitrary order relative to the order in which they were generated or sent. A messaging deadlock situation occurs when both agents concurrently send a request message on the same data segment before seeing the requests of their counterparts. Since processing of all local and remote requests on that data segment is blocked until the messaging sessions complete, such a sequence creates a messaging deadlock.

There are two types of messaging deadlocks in the context of the present DSM algorithm. One type is the no owner messaging deadlock described in the previous section. Another type is a deadlock termed permission/invalidation messaging deadlock, where the agent set as the owner of a data segment requires to upgrade the data segment's permission from shared to exclusive, and the non-owning agent also requires to upgrade the data segment's permission. Thus, the owning agent sends an invalidation request, and the non-owning agent sends a permission request. If both requests are sent before receiving and seeing the remote agents' requests, a deadlock is formed.

To identify messaging deadlocks, the present DSM algorithm employs a message id mechanism described herewith. Note that identification of the deadlock must be deterministic, otherwise data corruption may occur. Each agent maintains two message ids for each data segment—one id for the local agent and the second id for the remote agent. When an agent generates a message, an associated locally unique message id is generated and recorded in the message id local field of the data segment's entry. Messages are augmented with the values of the message ids (local and remote) stored in the relevant data segment's entry. When a message from the remote agent is handled by the local agent, the message id remote field of the data segment's entry is set by the local agent to equal the id of that message, thus signifying the latest message of the remote agent that was seen by the local agent.

Detection of messaging deadlocks is done within the procedures that process messages from the remote agent (see FIG. 9). The agents use the message ids stored in the data segment's entry (see FIG. 2) and received with the message to determine whether or not the remote agent saw the latest message sent by the local agent before sending its message. Specifically if the local message id is different than the local message id sent with the message from the remote agent, meaning that the remote agent did not see the message sent by the local agent before sending its message, then a deadlock is identified.

When a deadlock is identified, one of the agents, determined dynamically or statically (depending on the type of deadlock as described next), avoids waiting for the remote agent's response, thus resolving the deadlock. In a no owner messaging deadlock the resolving agent is predefined statically. In a permission/invalidation messaging deadlock the resolving agent is the one processing the invalidation request message (namely, the agent that sent the permission request message, and is the non-owning agent).

Figure 10:
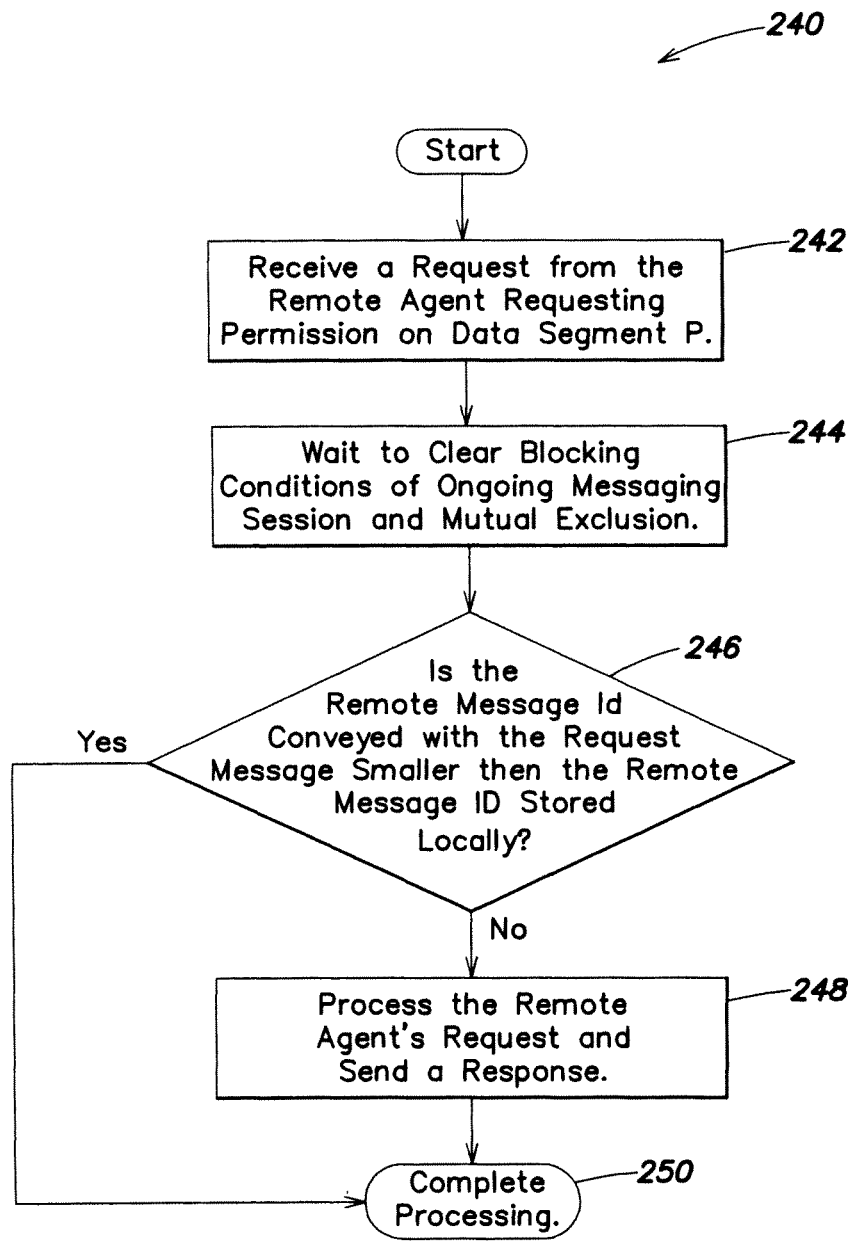
FIG. 10 is a flow diagram of a procedure for pruning obsolete messages, according to one embodiment.

An additional use of the message id mechanism is for pruning obsolete messages (illustrated by the procedure 240 shown in FIG. 10). Since messages arrive and are transferred for processing in an arbitrary order relative to their generation and sending, an agent may receive obsolete messages which should not be processed. If such a message is processed ownership may be lost, if the remote user that generated this message has already timed out. Therefore, upon reception of a message (step 242), and after waiting to clear any blocking conditions of an ongoing messaging session or mutual exclusion (step 244), the receiving agent determines (step 246) that the message is obsolete if the remote message id conveyed with the message is of a smaller order than the remote message id stored in the data segment's entry. If the message is determined to be obsolete, it is discarded and processing completes (step 250). Otherwise, the receiving agent processes the remote agent's request and sends (step 248) a response, which completes the process (step 250).

Message ids should be locally unique in order to support the no owner messaging deadlock, and should further enable ordering of the messages relative to their order of generation in order to support pruning of obsolete messages. These message ids should be allocated with sufficient size, so that a complete cycle of these ids including wrap-around is practically impossible with regard to the frequency of messaging sessions. Avoiding wrap-around should also be considered when calculating the difference between the values of message ids.

A-8. Recovering the Latest Data Segment Contents

Figure 11:
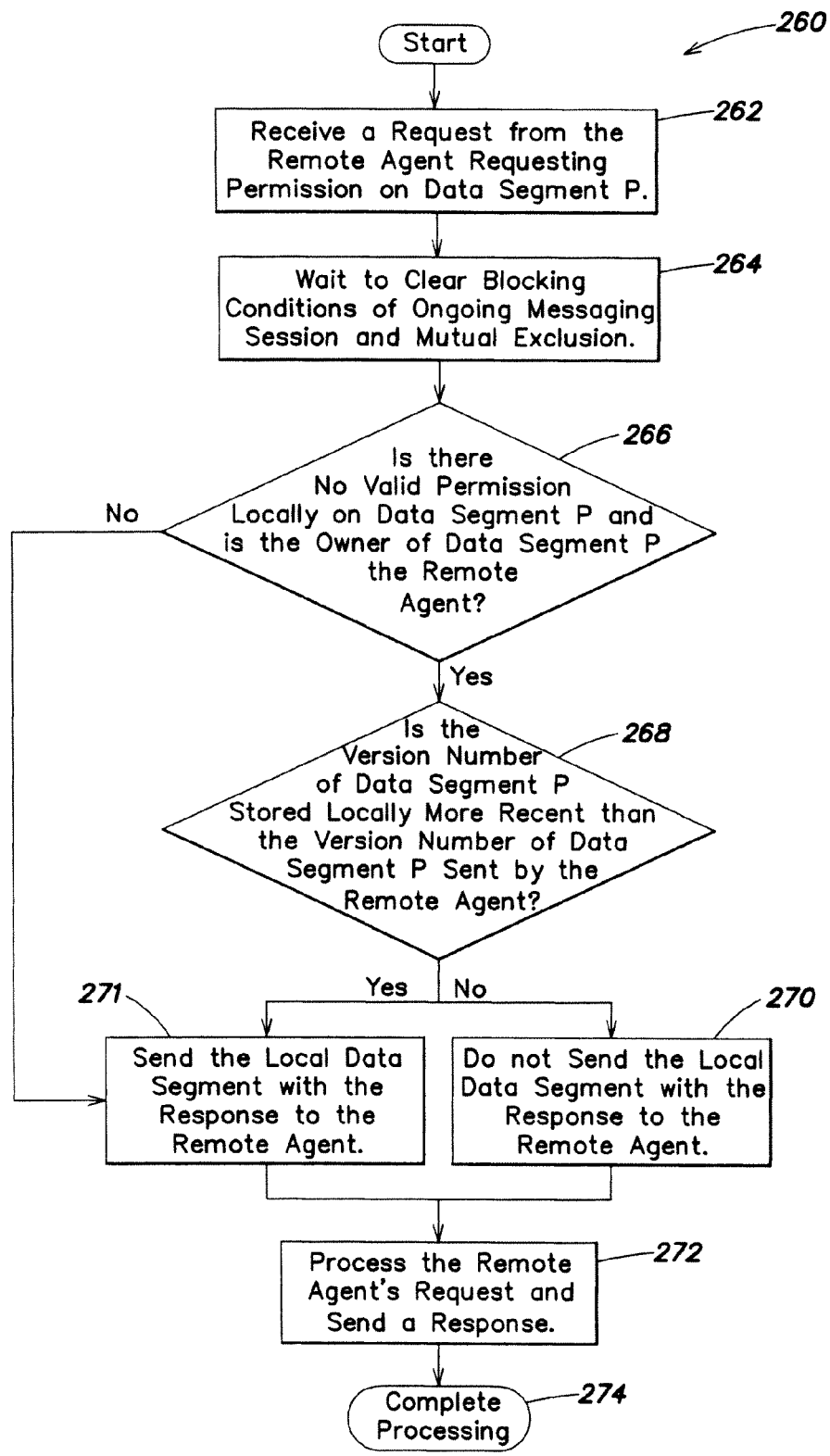
FIG. 11 is a flow diagram of a procedure for recovering the latest contents of a data segment, according to one embodiment.

When the ownership of a data segment is lost, the knowledge on the whereabouts of the latest contents of the data segment, normally stored with the owner, is also lost. Therefore, as part of the ownership recovery algorithm, specified in the previous sections, the latest contents of the data segment should be also identified and restored. A procedure for this purpose is illustrated in FIG. 11.

The computation for determining the location of the latest contents of a data segment with no owner is done within the procedure that processes a permission request message from the remote agent (e.g., the steps 262 and 264 of receiving a permission request from a remote agent and waiting to clear any blocking conditions of an ongoing messaging session or mutual exclusion). As further illustrated in FIG. 11, if the local agent determines (step 266) that it has a valid permission on the data segment, then the data segment's contents available to the local agent is latest, thus deterministically identified, and this contents can be sent (step 271) to the remote agent with the response (step 272) giving ownership, thus restoring the latest data segment's contents, and completing the process (step 274). Otherwise, step 266 determines there is no valid permission locally, and the latest contents of the data segment may be at either side. In this case data segment version numbers, maintained by each agent for each data segment, and conveyed with messages, are compared (step 268). The responding agent compares the data segment version number conveyed with the message to its own data segment version number, and determines that the data segment contents available locally is latest if the local version number is more recent than the version number sent by the remote agent. Only in this case the responding agent sends (step 271) its data segment contents to the remote agent; otherwise the responding agent does not send (step 270) its data segment contents.

Preferably, so that a data segment entry is highly compact, the data segment version number field is allocated with a minimal number of bits. Small version number fields (e.g. 2 bits) with fast wrap-around require a special method for maintaining them, specified herewith. Data segment version numbers are maintained so that when both agents have the same data segment contents their associated version numbers shall be identical; and when an agent updates a data segment, its version number shall be different (e.g. larger by one) than the version number stored by the remote agent. One embodiment of a method for setting the values of a data segment version number is described as follows.

When an agent upgrades its permission on a data segment from shared to exclusive, the data segment version number stored with that agent is set to equal a value larger by one relative to the version number stored with the remote agent. When an agent upgrades its permission on a data segment to shared permission, the data segment version number stored with that agent is set to equal the version number sent by the remote agent. The specifics of this method are further elaborated below.

In the case where the ownership is local and there is no permission on the data segment, regardless of the requested permission, the data segment version number is incremented by one relative to the stored version number.

In the case where the request is for shared permission: If ownership is remote and the data segment contents has been conveyed with the response message (meaning that the remote agent's contents is latest) and the remote agent keeps its shared permission, then the data segment version number is set to the remote agent's data segment version number conveyed within the message. Otherwise, if the remote agent does not keep a valid permission, then the data segment version number is incremented by one compared to the remote agent's version number.

In the case where the request is for exclusive permission: If the ownership is local and the current permission is shared and the remote agent has a copy of the data segment, then an invalidation request is sent to the remote agent and responded, to subsequently setting the data segment version number to a value larger by one than the version number conveyed with the remote agent's response. If the remote agent does not have copies (i.e. no invalidation request is sent), then the data segment version number is not modified, since there is already a difference of one between the local and the remote version numbers. Further elaborating, there are no copies due to either a previous exclusive permission request or invalidation request sent from the remote agent, or a previous shared permission request of a local user upgrading from no permission (where ownership is local)—in all cases the version number was already incremented. If ownership is remote and a permission request message is sent to the remote agent, then regardless if the data segment contents is sent with the response from the remote agent, the data segment version number is set to a value larger by one than the version number conveyed with the remote agent's message (thus creating a difference of one), since an exclusive permission is granted.

A-9. Modifying the Data Segment Entry after Sending a Response Message

Consider a procedure (e.g. FIG. 7) that processes a permission request message sent from the remote agent. After this procedure sends a response message to the remote agent, it must modify the data segment's entry to its new state, regardless of the unknown fate of the message. However, since this procedure features the method for resolving the no owner messaging deadlock (FIG. 9), operating concurrently with other operations, caution is exercised with regard to updating the data segment's entry, and it is modified in the following two cases.

Figure 12:
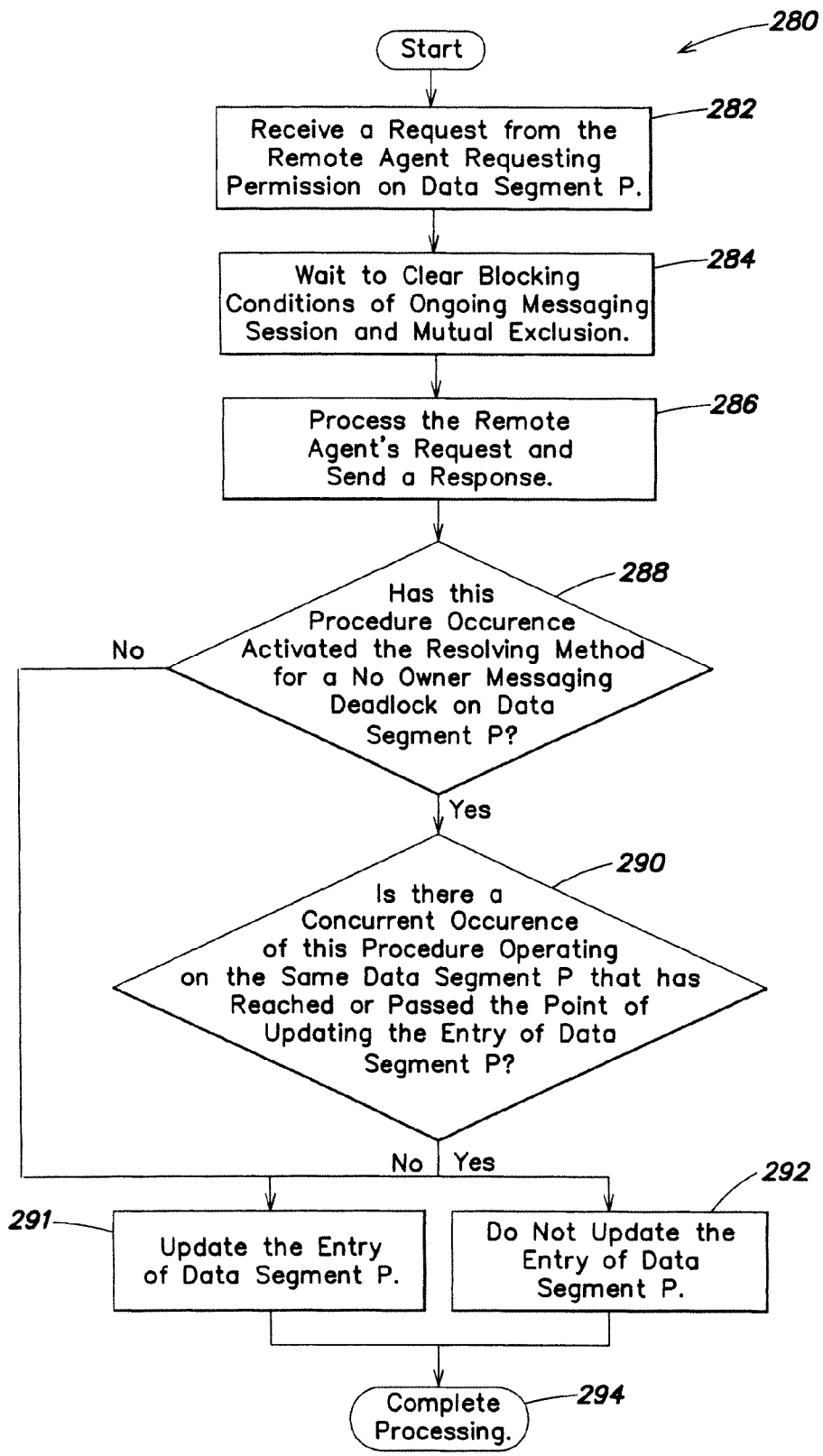
FIG. 12 is a flow diagram of a procedure for modifying the entry of a data segment after sending a response message, according to one embodiment.

As illustrated in FIG. 12, in a procedure for handling a permission request from a remote agent (steps 282-286), if it is determined (step 288) that this procedure does not activate the deadlock resolving method, then the entry is updated (step 291) and the process terminates (step 294). If it is determined (step 288) that this procedure activates the deadlock resolving method and it is determined (step 290) that a concurrent procedure operating on the same data segment has not yet reached the point of updating the data segment's entry, then the entry is updated (step 291), otherwise the deadlock resolving procedure does not update (step 292) the data segment's entry. This way, a deadlock resolving procedure does not override modifications made by a procedure that does not activate this method. This avoidance is required, since either the deadlock was indeed resolved by the deadlock resolving procedure, or the response it sent was no longer awaited for—in both cases its subsequent update of the data segment's entry is no longer required.

A-10. Summary

There has been described one embodiment of a DSM algorithm and technology in a two (2) node cluster that uniquely supports unreliable underlying message passing technologies. The DSM algorithm assumes complete uncertainty on whether a message that is sent reaches its destination (possibly with delays) or not, and assumes there is no feedback on the fate of each message. It further assumes no ordering on the reception of messages relative to their order of generation and sending. Given these assumptions, the present DSM algorithm efficiently maintains full consistency of both user and internal data.

A-11. System. Method and Computer Program Product

As will be appreciated by one skilled in the art, the present invention may be embodied as a system, method or computer program product. Accordingly, unless specified to the contrary, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized, unless specified to the contrary herein. The computer-usable or computer-readable medium may be, for example but not limited to, electronic, magnetic, optical, electromagnetic, infrared, or semiconductor. More specific examples (a non-exhaustive list) include: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

By way of example only, the described embodiments may be implemented on any cluster of x86_64 processor based servers, each having its own RAM, and the servers connected via a Gbit Ethernet network using two Gbit Ethernet switches, such that each server is connected to each of the switches.

Modifications can be made to the previously described embodiments of the present invention and without departing from the scope of the invention, the embodiments being illustrative and not restrictive.

The invention claimed is:

1. A method for resolving messaging deadlock in a distributed shared memory (DSM) using a processor device, comprising:

maintaining by each of a plurality of distributed shared memory (DSM) agents, as local parameters, a local-message-Identification (ID) to which a local DSM agent assigns a local unique ID upon issuing a request, and a remote-message-Identification (ID) to which a local DSM agent assigns the local unique ID received in an alternative request from a remote DSM agent; and if, prior to a non-owning one of the plurality of DSM agents receiving a request for access permission to the requested data segment and sending a response the owning one of the plurality of DSM agents sends the alternative request for the access permission to the requested data segment to the local DSM agent within a designated time of the request:

detecting by the non-owning one of the plurality of DSM agents that the invalid-permission messaging deadlock exists when both the non-owning one of the plurality of DSM agents processes the alternative request and the non-owning one of the plurality of DSM agents processes the request with both the request and the alternative request containing a value for a local-message-ID which is different than a local value for the local-message-ID that is stored in each of the plurality of DSM agents.

2. The method of claim 1, further including performing the maintaining for resolving an invalid-permission messaging deadlock for the plurality of DSM agents obtaining access permission on a requested data segment by the plurality of DSM agents when both an owning one of the plurality of DSM agents, having shared ownership over the requested data segment and seeking to upgrade to an exclusive ownership over the requested data segment, and the non-owning one of the plurality of DSM agents, seeking to obtain the access permission to the requested data segment, simultaneously sends an access permission request with neither the owning one of the plurality of DSM agents and the non-owning one of the plurality of DSM agents being aware of the access permission request sent by the other one.

3. The method of claim 2, further including incorporating the local-message-ID and the remote-message-ID in both requests and responses sent by each of the plurality of DSM Agents, wherein the non-owning one of the plurality of DSM agents processes a messaging deadlock message issued upon detection of the messaging deadlock.

4. The method of claim 1, further including resolving an invalid-permission messaging deadlock when the non-owning one of the plurality of DSM agents, which has been predetermined to act as an agent to resolve the invalid-permission messaging deadlock, determines that no other local user is acting to resolve the invalid-permission messaging deadlock.

5. The method of claim 4, further including unblocking by the non-owning one of the plurality of DSM agents the alternative request from the owning one of the plurality of DSM agents and sending a message to the non-owning one of the plurality of DSM agents granting the exclusive ownership of the requested data segment to the non-owning one of the plurality of DSM agents agent.

6. The method of claim 5, further including avoiding a completion of a messaging session initiated by the non-owning one of the plurality of DSM agents that sent a message to the owning one of the plurality of DSM agents that the non-owning one of the plurality of DSM agents is not the owner of the requested data segment.

7. The method of claim 4, further including blocking all other local users from acting to resolve the no-ownership-deadlock.

8. The method of claim 1, further including, when any of the requests are processed by the non-owning one of the plurality of DSM agents, setting the remote-message-ID stored in the requested data segment equal the remote-message-ID of the received request for indicating the non-owning one of the plurality of DSM agents is aware of the requests sent by the owning one of the plurality of DSM agents.

9. The method of claim 1, further including assigning a value to the local-message-ID for inducing an order of values for arranging messages according to an order of generation.

10. A system for resolving messaging deadlock in a distributed shared memory (DSM) in a computing environment, the system comprising:
a plurality of distributed shared memory (DSM) agents operating within the DSM, and
a processor device in communication with the plurality of DSM agents, wherein the processor device:
maintains by each of a plurality of distributed shared memory (DSM) agents, as local parameters, a local-message-Identification (ID) to which a local DSM agent assigns a local unique ID upon issuing a request, and a remote-message-Identification (ID) to which a local DSM agent assigns the local unique ID received in an alternative request from a remote DSM agent, and
if, prior to a non-owning one of the plurality of DSM agents receiving a request for access permission to the requested data segment and sending a response, the owning one of the plurality of DSM agents sends the alternative request for the access permission to the requested data segment to the local DSM agent within a designated time of the request:
detects by the non-owning one of the plurality of DSM agents that the invalid-permission messaging deadlock exists when both the non-owning one of the plurality of DSM agents processes the alternative request and the non-owning one of the plurality of DSM agents processes the request with both the request and the alternative request containing a value for a local-message-ID which is different than a local value for the local-message-ID that is stored in each of the plurality of DSM agents.

11. The system of claim 10, wherein the processor device performs the maintaining for resolving an invalid-permission messaging deadlock for the plurality of DSM agents obtaining access permission on a requested data segment by the plurality of DSM agents when both an owning one of the plurality of DSM agents, having shared ownership over the requested data segment and seeking to upgrade to an exclusive ownership over the requested data segment, and the non-owning one of the plurality of DSM agents, seeking to obtain the access permission to the requested data segment, simultaneously sends an access permission request with neither the owning one of the plurality of DSM agents and the non-owning one of the plurality of DSM agents being aware of the access permission request sent by the other one.

12. The system of claim 11, wherein the processor device incorporates the local-message-ID and the remote-message-ID in both requests and responses sent by each of the plurality of DSM Agents, wherein a non-owning one of the plurality of DSM agents processes a messaging deadlock message issued upon detection of the messaging deadlock.

13. The system of claim 10, wherein the processor device resolves an invalid-permission messaging deadlock when the non-owning one of the plurality of DSM agents, which has been predetermined to act as an agent to resolve the invalid-permission messaging deadlock, determines that no other local user is acting to resolve the invalid-permission messaging deadlock.

14. The system of claim 13, wherein the processor device unblocks by the non-owning one of the plurality of DSM agents the alternative request from the owning one of the plurality of DSM agents and sending a message to the non-owning one of the plurality of DSM agents granting the exclusive ownership of the requested data segment to the non-owning one of the plurality of DSM agents agent.

15. The system of claim 14, wherein the processor device avoids a completion of a messaging session initiated by the non-owning one of the plurality of DSM agents that sent a message to the owning one of the plurality of DSM agents that the non-owning one of the plurality of DSM agents is not the owner of the requested data segment.

16. The system of claim 13, wherein the processor device blocks all other local users from acting to resolve the no-ownership-deadlock.

17. The system of claim 10, wherein the processor device, when any of the requests are processed by the non-owning one of the plurality of DSM agents, sets the remote-message-ID stored in the requested data segment equal the remote-message-ID of the received request for indicating the non-owning one of the plurality of DSM agents is aware of the requests sent by the owning one of the plurality of DSM agents.

18. The system of claim 10, wherein the processor device assigns a value to the local-message-ID for inducing an order of values for arranging messages according to an order of generation.

19. A computer program product for resolving messaging deadlock in a distributed shared memory (DSM) using a processor device, the computer program product comprising a non-transitory computer-readable storage medium having computer-readable program code portions stored therein, the computer-readable program code portions comprising:

a first executable portion that maintains by each of a plurality of distributed shared memory (DSM) agents, as local parameters, a local-message-Identification (ID) to which a local DSM agent assigns a local unique ID upon issuing a request, and a remote-message-identification (ID) to which a local DSM agent assigns the local unique ID received in an alternative request from a remote DSM agent; and a second executable portion that if, prior to a non-owning one of the plurality of DSM agents receiving a request for access permission to the requested data segment and sending a response, the owning one of the plurality of DSM agents sends the alternative request for the access permission to the requested data segment to the local DSM agent within a designated time of the request:

detects by the non-owning one of the plurality of DSM agents that the invalid-permission messaging deadlock exists when both the non-owning one of the plurality of DSM agents processes the alternative request and the non-owning one of the plurality of DSM agents processes the request with both the request and the alternative request containing a value for a local-message-ID which is different than a local value for the local-message-ID that is stored in each of the plurality of DSM agents.

20. The computer program product of claim 19, further including a third executable portion that performs the maintaining for resolving an invalid permission messaging deadlock for the plurality of DSM agents obtaining access permission on a requested data segment by the plurality of DSM agents when both an owning one of the plurality of DSM agents, having shared ownership over the requested data segment and seeking to upgrade to an exclusive ownership over the requested data segment, and the non-owning one of the plurality of DSM agents, seeking to obtain the access permission to the requested data segment, simultaneously sends an access permission request with neither the owning one of the plurality of DSM agents and the non-owning one of the plurality of DSM agents being aware of the access permission request sent by the other one.

21. The computer program product of claim 20, further including a third executable portion that incorporates the local-message-ID and the remote-message-ID in both requests and responses sent by each of the plurality of DSM Agents, wherein a non-owning one of the plurality of DSM agents processes a messaging deadlock message issued upon detection of the messaging deadlock.

22. The computer program product of claim 19, further including a third executable portion that resolves an invalid-permission messaging deadlock when the non-owning one of the plurality of DSM agents, which has been predetermined to act as an agent to resolve the invalid-permission messaging deadlock, determines that no other local user is acting to resolve the invalid-permission messaging deadlock.

23. The computer program product of claim 22, further including a fourth executable portion that unblocks by the non-owning one of the plurality of DSM agents the alternative request from the owning one of the plurality of DSM agents and sending a message to the non-owning one of the plurality of DSM agents granting the exclusive ownership of the requested data segment to the non-owning one of the plurality of DSM agents agent.

24. The computer program product of claim 23, further including a fifth executable portion that avoids a completion of a messaging session initiated by the non-owning one of the plurality of DSM agents that sent a message to the owning one of the plurality of DSM agents that the non-owning one of the plurality of DSM agents is not the owner of the requested data segment.

25. The computer program product of claim 22, further including a fourth executable portion that blocks all other local users from acting to resolve the no-ownership-deadlock.

26. The computer program product of claim 19, further including a third executable portion that, when any of the requests are processed by the non-owning one of the plurality of DSM agents, sets the remote-message-ID stored in the requested data segment equal the remote-message-ID of the received request for indicating the non-owning one of the plurality of DSM agents is aware of the requests sent by the owning one of the plurality of DSM agents.

27. The computer program product of claim 19, further including a third executable portion that assigns the value to the local-message-ID for inducing an order of values for arranging messages according to an order of generation.

\* \* \* \* \*